United States Patent [19]

Frenznick et al.

[11] Patent Number: 4,674,816

[45] Date of Patent: Jun. 23, 1987

[54] ELECTRICAL CONNECTION SYSTEM

[75] Inventors: Anton Frenznick, Nuremberg; Bernhard Just, Kernen; Eugen Krauss, Waiblingen; Werner Pfander, Fellbach; Ewald Tränkle, Backnang, all of Fed. Rep. of Germany

[73] Assignee: Robert Bosch GmbH, Stuttgart, Fed. Rep. of Germany

[21] Appl. No.: 786,174

[22] PCT Filed: Jun. 22, 1982

[86] PCT No.: PCT/DE82/00130

§ 371 Date: Sep. 21, 1982

§ 102(e) Date: Sep. 21, 1982

[87] PCT Pub. No.: WO83/00263

PCT Pub. Date: Jan. 20, 1983

Related U.S. Application Data

[63] Continuation of Ser. No. 425,092, Sep. 21, 1982, abandoned.

[30] Foreign Application Priority Data

Jul. 9, 1981 [DE] Fed. Rep. of Germany ....... 3127124

[51] Int. Cl.[4] ............................................ H01R 11/00

[52] U.S. Cl. .................................... 439/588; 439/736; 439/869

[58] Field of Search ................ 339/60 R, 60 C, 60 M, 339/218 R, 218 M

[56] References Cited

U.S. PATENT DOCUMENTS 4,032,214 6/1977 McNerney .................... 339/218 M 4,181,394 1/1980 Dodge ............................ 339/218 R

FOREIGN PATENT DOCUMENTS 1100198 2/1961 Fed. Rep. of Germany .

946788 1/1964 United Kingdom .

*Primary Examiner*—Gil Weidenfeld

*Assistant Examiner*—Paula A. Austin

*Attorney, Agent, or Firm*—Frishauf, Holtz, Goodman & Woodward

[57] ABSTRACT

To reliably prevent ingress of moisture to a connection between an electrical connecting cable or line to an electrical apparatus within a housing, the conductors of the cable or line are externally surrounded by an insulating layer which is of such a material that it joins, by melting or chemical reaction with the material of a surrounding bushing or sleeve, which bushing or sleeve then can be secured in a wall of the apparatus, for example by a removable rubber ring (FIG. 2) or can be molded into the housing of an electrical apparatus, for example a sensor; preferably, the materials of the housing and of the plug or sleeve also join, either by melting together or by chemical reaction. For a melt connection, a thermoplastic such as polyamide is suitable; for reactive connection, a reactive thermosetting plastic, for example polyester imide, or epoxy may be used.

23 Claims, 2 Drawing Figures

9 11a 11 13 5a 2a
1 2 7 5
15 -4-
8 3 6
14
10 12a 12 6a 3a 9
11a
11
13
5a
2a
1
2
5
7
4
15
8
3
6
14
10
12a
12
6a
3a 21a
21
16
17
19a
+23-
-28-
19
20a
20
25
18
22a
22
24
26
27

ELECTRICAL CONNECTION SYSTEM

This application is a continuation of application Ser. No. 425,092, filed Sept. 21, 1982, now abandoned.

The present invention relates to a connection arrangement for an electrical conductor to connect the conductor to electrical apparatus, and more particularly to such a connection arrangement which is water-proof, pressure-resistant, and suitable to connect, for example, electrical cabling or wiring to electronic components and sensors used in automotive applications in locations where the terminal portions of the cables and wires are exposed to moisture, shock, vibration, and varying pressures.

BACKGROUND

It is known to dispose a shrink tube over end sections, surrounding a cable conductor extending from a plastic bushing or plug; the shrink tube extends up to the bare end, of the conductors. The shrink tube covers the transition between the bare ends of the conductor and the conductor itself, which is surrounded with an insulating sheath and forms one cable element or wire of the line. A plastic bushing or plur, in turn, is extruded around the cable ends and the end section of a plastic jacket surrounding the cables, and is bonded with this jacket. The arrangement has a disadvantage; the ends of the conductors are not sufficiently moisture-proof. In the case of stranded conductors, the moisture can seep between the individual strands. Although this disadvantage can be eliminated by tinning the strands, still a seal relative to the shrink tube is attained only if the tinning produces good roundness of the conductor so that the shrink tube rests against it on all sides. However, embodying the known line connection by round tinning of the strands and sealing off the shrink tube is relatively labor- and cost-intensive.

THE INVENTION

It is an object to provide a connection arrangement, and electrical cable connectors which are immune to external ambient conditions detrimental to good electrical contacts and connections, and which can make, effectively, sealed electrical connections in the interior of a plastic housing, for example to a sensor element.

Briefly, the electrical wires have insulating material placed thereabout, for example sleeves, insulating enamel or the like.

The terminal end parts of the wires are bare, for connection to the electrical apparatus. An entrance bushing or plug is used to connect the wires into a housing. To seal the wires into the plug, the plug, or plastic bushing, as well as the adhering insulating layers on the wires, are made of materials which join together, for example by melting together during injection molding of the plug or bushing around the wires and their insulating layers, or by chemical interaction of the material of the insulating layers and the material of the plug or bushing. The result will be a bond between the cable, or its outer sheath, which is not only mechanically tight, but which forms what may be termed an internally thermally or chemically welded interconnection or juncture between the insulating material of the wires and the material of the plug or bushing, throughout the extent of engagement of the plug or bushing about the wire.

In accordance with a feature of the invention, and when the cables are stranded cables, solid wire ends are spliced to the stranded cables, the splice surrounded by the insulating layer and the splice, together with the insulating layer, encapsulated with the material of the plug or bushing which joins with the layer of insulating material. This prevents possible seepage of moisture between strands of the stranded wires or cables while securely retaining the outer jacket or sheath of the connecting line, and all the wires or cables within the joined layer of insulating material and the material of the bushing.

The arrangement according to the invention has the advantage that the intrusion of moisture between the electric conductor and the plastic bushing or, between the plastic bushing and the line jacket surrounding both it and the line ends, and between the line jacket and the housing surrounding is prevented. A plastic bushing can be insertion molded directly around the line. The result is a connecting line which is pressure-tight and moisture-proof and suitable for sensors which are located at exposed points in a motor vehicle (intended for example for an antiskid brake system or for digital motor electronics). A further advantage is mechanical strength of the connecting line which is easily attainable.

In accordance with a preferred feature of the invention, a solid end conductor is used, and a layer of a suitable melting thermoplastic or a reactive thermosetting plastic is applied on the insulation adhering to a portion of the cable, this plastic layer tightly bonding by melting or reacting with the thermoplastic or thermosetting plastic of the plastic bushing when the bushing is molded on. The plastic bushing bonds equally well with the line jacket, if a jacket-type line is to be used. It is furthermore possible to insert the line, with the plastic bushing molded around it, into a bore of the housing in which means for effecting sealing from pressure and moisture are provided between the housing and the plastic bushing.

DRAWING

Exemplary embodiments of the invention are shown in the drawing. Shown are:

FIG. 1, a first exemplary embodiment of the end of a connecting line having a pressure- and moisture-proof bushing, together with the electrical appliance connected therewith shown in simplified form and the bushing embedded in the insulation housing of the appliance; and FIG. 2, a second exemplary embodiment of the connecting line having a pressure- and moisture-proof bushing, which is disposed in a bore of a housing structure.

DESCRIPTION OF THE EXEMPLARY EMBODIMENTS

Figure 1:
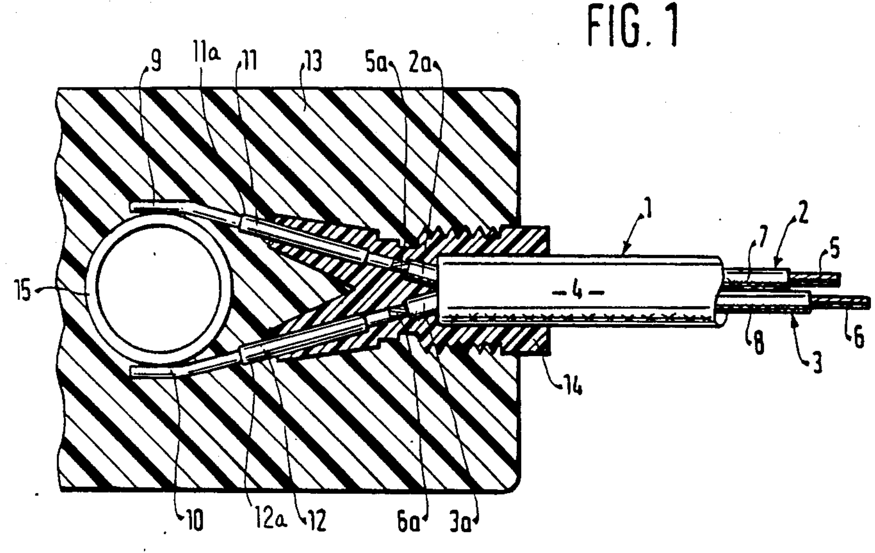

FIG. 1 illustrates a first exemplary embodiment of the invention in which a connecting line is connected in a pressure- and moisture-proof manner to an electrical apparatus, or appliance, shown as a sensor. The connecting line 1 has two cables 2 and 3, which are surrounded by a common outer plastic jacket or sheath 4. The cables 2 and 3 comprise respective stranded conductors 5 and 6, which are embedded in associated insulating sheaths 7 and 8. The conductors 5 and 6 are blank or bare at one end 5*a*; 6*a*, that is the insulating sheaths 7 and 8 are stripped away at these ends. The bare conductor ends 5*a* and 6*a* are adjoined by sections 2*a* and 3*a*, respectively, of the cables from which the plastic jacket 4 has been removed. Solid conductors 9 and 10, respectively, are secured in an electrically conductive manner to the conductor ends 5*a* and 6*a* of the stranded conductors 5 and 6, being soldered or welded in place by way of example. One section of the solid conductor 9; 10 is coated with an adherent insulation 11; 12. The adherent insulation 11; 12 is a lacquer coating, by way of example. The adherent insulation 11; 12 prevents the spread of moisture at the periphery of the solid conductor 9 and 10. The solid conductor ends 9 and 10 serve to connect the line 1 to the electrical apparatus, shown schematically as a sensor 15.

The end of the connecting line 1 is inserted into a housing 13 of the electrical apparatus of insulating material in a pressure- and moisture-proof manner. The end of the connecting line 1 has a bushing 14 of a thermoplastic or thermosetting, i.e. duroplastic insulating material extruded around the end of the line 1. An injection molding form or die is suitably used. The selection of an insulating material is to be governed by also considering the level of heat resistance required, which in the case of such functionally critical appliances as sensors in motor vehicles must also be taken into consideration in addition to providing pressure- and moisture-proofing. The bushing 14 surrounds the end section of the outer plastic jacket or sheath 4, the protruding ends 2*a* and 3*a* of the cores 2 and 3 having the bared ends 5*a* and 6*a* of the stranded conductors 5 and 6 as well as the colid conductors 9; 10 secured to the stranded conductors 5;6, at least as far as to include a portion of the insulation 11; 12 adhering to them. In the areas where the solid conductors 9; 10 and the ends 5*a*; 6*a* of the conductors 5; 6 are joined, the bushing 14 surrounds the individual conductors 5*a*, 9 and 6*a*, 10 respectively.

The free ends of the solid conductors 9; 10 are also bared and connected in a manner known per se to a sensor 15 not shown in further detail. The housing 13 of the sensor 15 encloses, surrounds, and sheathes the connection zone between the connecting line 1 and the sensor 15. The housing 13 is also made of a thermoplastic or thermosetting, i.e. duroplastic insulating material.

In accordance with a feature of the invention, the materials of the bushing 14 and of the insulation 11, 12 are selected to intimately bond or to join together by melting together or by chemically reacting. The housing 13, also, preferably joins by melting or reacting with the bushing 14 and with the portion of the adherent insulation 11; 12 of the solid conductors 9; 10 which is not surrounded by the bushing 14. The use of the solid conductors 9, 10 with the adherent insulation 11; 12 as connecting ends of the stranded conductors 5; 6 offers a simple means of leading in a conductor in a pressure- and moisture-proof manner, for the insulation 11; 12 applied in an adherent manner to the solid conductors 9; 10 is, like the housing and the bushing, tightly bound in one portion to the bushing 14 and in the adjoining portion to the housing 13. The solid conductors 9; 10 furthermore assure that the connection ends of the connecting line 1 are sufficiently mechanically stable. Examples of suitable materials for the solid wires 9, 10 are fully annealed, lacquer-insulated magnet wires.

A particularly stable connection is attained if a further layer 11*a*, 12*a*, e.g. a melting thermoplastic layer, for instance polyamide, or a reactive thermosetting plastic layer, for instance polyester imide or epoxy, is additionally applied to the adherent insulating layers 11, 12.

Figure 2:
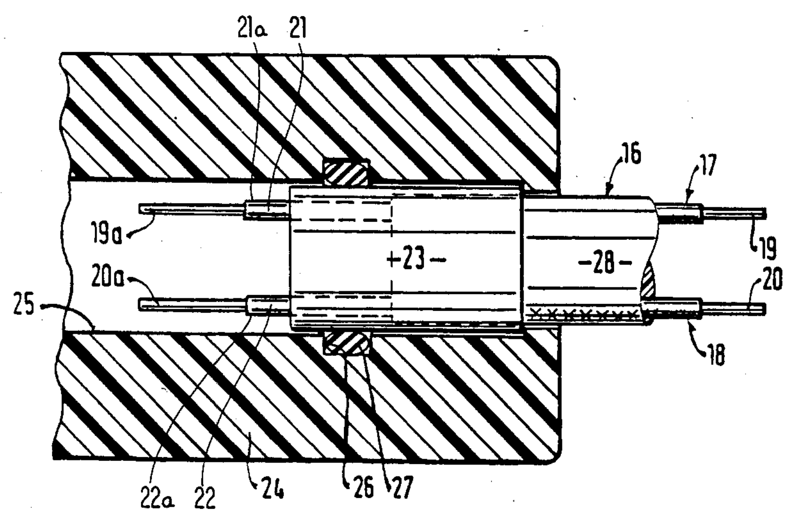

FIG. 2 shows a second exemplary embodiment of the connecting line of the invention, which is removable from the apparatus. The line 16 is inserted together with a bushing 23, surrounding line 16 into a bore 25 of a housing 24 of the electrical apparatus in a pressure- and moisture-proof, yet releasable, manner. The connecting line 16 has an outer sheath or jacket 28, within which are two cables 17 and 18 having respective solid conductors 19 and 20, which are provided with individual adherent insulating sheaths 21 and 22, respectively. An enamel, or lacquer coating is suitable for insulation 21, 22. An additional layer of a suitable melting thermoplastic or a reactive thermosetting plastic may be applied to the adherent insulating layers 21, 22.

In accordance with the invention, the cables 17; 18, which are spaced apart from one another, are embedded in a cylindrical bushing 23 which enters into a pressure- and moisture-proof combination with the insulation 21; 22 or the additional plastic layer applied thereto. The housing 24 of the electrical apparatus is formed with a bore 25 having an annular groove 26. The apparatus may be a sensor, for instance for an antiskid brake system or a digital electronic system for an engine. A sealing ring 27 is disposed in the annular groove 26. The bushing 23 is inserted with the connecting ends 19*a* or 20*a* of the solid conductors 19 and 20 into the bore 25 and is surrounded, again in a pressure- and moisture-proof manner, by the sealing ring 27. The connecting ends 19*a* and 20*a* extending through the bore 25 may be connected in a manner known per se and not known in further detail with the electrical apparatus, not shown in further detail in FIG. 2. The connecting line 16 protrudes from the housing 24. The plastic jacket 28 surrounds and embeds the cables 17 and 18. Jacket 28, and hence cables 17, 18 are secure against pull-out from the bushing 23 by the bonding connection of jacket 28 with the bushing 23 when the bushing 23 is extruded.

We claim:

1. Pressure and moisture-sealed connection arrangement for end portions (9, 10; 19*a*, 20*a*) of electrical conductors (5, 6; 19, 20) of an electrical connection line (1; 16) to connect the electrical connection line to a plastic housing element (13, 24) of an electrical apparatus (15) having a plastic plug or bushing (14; 23) molded about the connection line (1; 16) and positioned within the housing element (13; 24);

an adhering insulating layer (11, 12; 21, 22) surrounding part of the end portions of the electrical conductors and molded in the plastic bushing; and a cover layer of thermoplastic or thermosetting plastic material (11*a*, 12*a*; 21*a*, 22*a*) applied over said adhering insulating layer (11, 12; 21, 22);

and wherein the materials of the insulating layer (11, 12; 21, 22), of the cover layer (11*a*, 12*a*; 21*a*, 22*a*), and of the plastic plug or bushing (14; 23) are respectively matched and selected to intimately join together upon injection-molding of the plastic plug or bushing about the parts of the end portions of the electrical conductors covered by said insulating layer by at least one of:

melting together to form a melt joinder or melt connection or chemically reacting to form a chemically reacted bond and junction.

2. Arrangement according to claim 1, wherein at least part of the end portions (9, 10, 19*a*, 20*a*) of the electrical conductors are solid conductors (9, 10; 19, 20).

3. Arrangement according to claim 1, wherein said electrical conductors (5, 6) are a combination of
   stranded conductors extending outwardly of the housing elements,
   end portions formed of solid conductor elements (9, 10; 19*a*, 20*a*);
   and a junction joining the solid conductor elements;
   and wherein the adhering insulating layer (11, 12; 21, 22) extends over at least part of the solid conductor elements, said plastic plug or bushing (14, 23) extending over both the stranded conductors as well as over the adhering insulating layer (11, 12; 21, 22) and over the solid conductor elements, and over the junction between the stranded conductor and the solid conductor elements.

4. Arrangement according to claim 1, wherein the insulating layer is a securely adhering insulation lacquer or enamel (11, 12; 21, 22) adhering to said parts of the end portions of the electrical conductors.

5. Arrangement according to claim 1, wherein the plastic housing element (24) is formed with a bore (25) therein;
   and a sealing ring or bushing (27) is provided, surrounding the plastic plug or bushing (23) for removably seating the plastic plug or bushing in said bore, while providing for a sealed, tight seat of the bushing in said bore.

6. Arrangement according to claim 1, wherein the joinder of the plastic plug or bushing (14, 23) and of the adhering insulating layer (11, 12; 21, 22) is by melting together of the material of the plug or bushing and of the material of said cover layer (11*a*, 12*a*, 21*a*, 22*a*) and of the material of said adhering insulating layer.

7. Arrangement according to claim 1, wherein the joinder of the plastic plug or bushing (14, 23) and of the adhering insulating layer (11, 12; 21, 22) is by chemical reaction of the material of the plug or bushing with the material of the cover layer (11*a*, 12*a*, 21*a*, 22*a*) and the material of the adhering insulating layer.

8. Arrangement according to claim 1, wherein said cover layer (11*a*, 12*a*, 21*a*, 22*a*) comprises an adhesive layer capable of chemically reacting with the material of the plastic plug or bushing (14, 23) applied over the insulating layer (11, 12, 21, 22).

9. Arrangement according to claim 1, wherein the plastic plug or bushing (14, 23) comprises thermoplastic material.

10. Arrangement according to claim 9, wherein the thermoplastic material is polyamide.

11. Arrangement according to claim 1, wherein the plastic plug or bushing (14, 23) comprises a thermosetting resin.

12. Arrangement according to claim 11, wherein the thermosetting resin includes polyimide.

13. Arrangement according to claim 11, wherein said cover layer (11*a*, 12*a*; 21*a*, 22*a*) comprises thermoplastic material.

14. Arrangement according to claim 13, wherein the cover layer (11*a*, 12*a*, 21*a*, 22*a*) comprises polyamide.

15. Arrangement according to claim 13, wherein the plastic plug or bushing (14, 23) comprises thermoplastic material.

16. Arrangement according to claim 13, wherein the plastic plug or bushing (14, 23) comprises a thermosetting resin.

17. Arrangement according to claim 1, wherein said cover layer (11*a*, 12*a*, 21*a*, 22*a*) comprises a thermosetting resin.

18. Arrangement according to claim 17, wherein said plug or bushing (14, 23) comprises a thermoplastic or thermosetting resin.

19. Arrangement according to claim 1, wherein the plastic plug or bushing (14) is embedded in the plastic housing element (13) in moisture-proof, sealed relation.

20. Arrangement according to claim 19, wherein the materials of the plastic housing element (13) and of the plastic plug or bushing (14) are respectively matched and selected to join together upon injection-molding of the plastic housing element about said plastic plug or bushing.

21. Pressure and moisture-sealed connection arrangement for end portions (9, 10; 19*a*, 20*a*) of electrical conductors (5, 6, 19, 20) of an electrical connection line (1, 16) to connect the electrical connection line to a plastic housing element (13, 24) of an electrical apparatus (15) having
   a plastic plug or bushing (14, 23) molded about the connection line (1, 16) and positioned within said housing element (13, 24); and
   an adhering insulating lacquer or enamel layer (11, 12; 21, 22) surrounding part of the end portions of the electrical conductors, and molded in the plastic bushing;
   a cover layer of thermoplastic or thermosetting plastic material (11*a*, 12*a*; 21*a*, 22*a*) applied over said adhering insulating layer (11, 12; 21, 22);
   and wherein the materials of the insulating layer (11, 12; 21, 22), of the cover layer (11*a*, 12*a*; 21*a*, 22*a*), and of the plastic plug or bushing (14; 23) are respectively matched and selected to intimately join together upon injection-molding of the plastic plug or bushing about the parts of the end portions of the electrical conductors covered by said insulating layer by at least one of:
   melting together to form a melt joinder or melt connection;
   chemically reacting to form a chemically reacted bond and junction.

22. Arrangement according to claim 21, wherein the cover layer (11*a*, 12*a*, 21*a*, 22*a*) comprises thermoplastic material.

23. Arrangement according to claim 21, wherein the plastic plug or bushing (14, 23) comprises thermoplastic material or a thermosetting resin.

* * * * *